(12) United States Patent
Goudy et al.

(10) Patent No.: US 9,720,425 B2
(45) Date of Patent: Aug. 1, 2017

(54) LOW SPLASH FLUID SHUTOFF VALVE ASSEMBLY

(71) Applicant: The Procter & Gamble Company, Cincinnati, OH (US)

(72) Inventors: Eric Shawn Goudy, Liberty Township, OH (US); Justin Thomas Cacciatore, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 5 days.

(21) Appl. No.: 14/877,957

(22) Filed: Oct. 8, 2015

(65) Prior Publication Data

US 2017/0102720 A1   Apr. 13, 2017

(51) Int. Cl.
  *G05D 16/04*   (2006.01)
  *F16K 3/02*   (2006.01)
  *F16K 3/32*   (2006.01)

(52) U.S. Cl.
  CPC .......... *G05D 16/04* (2013.01); *F16K 3/0218* (2013.01); *F16K 3/0254* (2013.01); *F16K 3/32* (2013.01); *Y10T 137/87917* (2015.04)

(58) Field of Classification Search
  CPC ..... G05D 16/04; F16K 3/0218; F16K 3/0254; F16K 3/32

USPC .................................. 137/613, 614, 614.05
See application file for complete search history.

(56) References Cited

U.S. PATENT DOCUMENTS

| | | | |
|---|---|---|---|
| 2,828,146 A * | 3/1958 | Abbey ..................... | F16K 3/02 137/614.01 |
| 3,790,128 A * | 2/1974 | Hempelmann et al. ..................... | B23Q 35/36 137/614 |
| 4,512,379 A | 4/1985 | Hennig | |
| 5,137,187 A | 8/1992 | Nichols et al. | |
| 5,363,879 A * | 11/1994 | Rhoades ................. | F16L 29/04 137/377 |
| 5,954,086 A | 9/1999 | Ronchi | |
| 7,000,656 B2 | 2/2006 | Todd | |
| 7,958,910 B2 | 6/2011 | Nakamori et al. | |
| 8,191,576 B2 * | 6/2012 | Himmelmann ....... | F16K 27/003 137/614.02 |

FOREIGN PATENT DOCUMENTS

EP   0 278 560 A1   8/1988
FR   2 905 121 B1   9/2010

* cited by examiner

*Primary Examiner* — Kevin Lee
(74) *Attorney, Agent, or Firm* — Lauren Christine Gonzalez; David Michael Weirich (57) ABSTRACT

A low splash fluid shutoff valve assembly that can be used with systems that fill containers with fluids and methods of reducing fluid splash-back in filling operations.

36 Claims, 8 Drawing Sheets

LOW SPLASH FLUID SHUTOFF VALVE ASSEMBLY

FIELD OF THE INVENTION

This disclosure is directed to an improved fluid shutoff valve, and more particularly to a low splash fluid shutoff valve that can be used with systems that fill containers with fluids at high rates of speed.

BACKGROUND OF THE INVENTION

High speed container filling systems are well known and used in many different industries. In many of the systems, fluids are supplied to containers to be filled through a series of pumps, pressurized tanks and flow meters and/or valves to help ensure the correct amount of fluid is dispensed into the containers. When filling containers, especially at high rates, however, conventional pumps, pressurized or gravity fed systems and valves can create a surge of fluid at the end of the filling cycle that can cause the fluid in the container to splash in a direction generally opposite to the direction of filling and often out of the container being filled. This can lead to a waste of the fluid, contamination of the outer surfaces of the container and/or contamination of the filling equipment itself. Further, compensating for splash-back to reduce the adverse effects often forces manufacturers to use containers such as bottles that include enough head space to prevent any back-splash from exiting the bottle. As such, the containers used often have a volume that is significantly larger than the volume of the fluid to be filled into the container. This creates waste in terms of the amount of material used to make the containers, which can be costly, and can result in containers that appears to be less than completely filled.

Accordingly, it would be desirable to provide an improved fluid filling system, and especially a fluid shutoff valve assembly that will provide very little or no splash-back at the end of the filling cycle.

SUMMARY OF THE INVENTION

The present invention is directed to a fluid shutoff valve assembly for a fluid filling line, the valve assembly having a fluid flow path defining a direction of fluid flow, the assembly comprising: a fluid inlet orifice in fluid communication with a source of a fluid, the fluid inlet orifice allowing the fluid to flow in the direction of fluid flow from the source of the fluid into the fluid flow path of the valve assembly; a fluid outlet orifice in fluid communication with the fluid flow path of the valve assembly and through which the fluid may flow out of the valve assembly; and a fluid shutoff valve in fluid communication with the fluid inlet and the fluid outlet, the fluid shutoff valve having a fluid blocking portion and a fluid flow-through portion, the fluid shutoff valve being moveable from a filling position wherein the fluid flow-through portion is aligned with the fluid flow path to a closed position wherein the fluid blocking portion is aligned with the fluid flow path, wherein the fluid shutoff valve is oriented such that it moves in a direction that is generally perpendicular to the direction of fluid flow at a location where the fluid shutoff valve intercepts the fluid flow path.

In addition, the invention is directed to a fluid shutoff valve assembly for a high-speed fluid filling line, the valve assembly having a fluid flow path defining a direction of fluid flow, the assembly comprising: a fluid inlet orifice in fluid communication with a source of a fluid that is under pressure, the fluid inlet orifice allowing the fluid to flow in the direction of fluid flow from the source of the fluid into the fluid flow path of the valve assembly; a fluid outlet orifice in fluid communication with the fluid flow path of the valve assembly and through which the fluid may flow out of the valve assembly; a first valve in fluid communication with the fluid inlet and having a first valve open configuration which allows the fluid to flow through the first valve and a first valve closed configuration that prevents fluid from flowing past the first valve; and a second valve in fluid communication with the first valve and the fluid outlet orifice, the first valve and the second valve being separated from each other by a reservoir region having a length of at least about 5 mm, the second valve having a second valve open configuration which allows the fluid to flow through the second valve and a second valve closed configuration that prevents fluid from flowing past the second valve, wherein the second valve is oriented such that it moves in a direction that is generally perpendicular to the direction of fluid flow at a location where the second valve intercepts the fluid flow path, and wherein the valve assembly is configured such that the first valve closes before the second valve closes, thereby reducing the pressure of the fluid in the fluid flow path located between the first valve and the second valve prior to the second valve closing.

Also, the present invention is directed to a method of reducing the back-splash associated with filling a container with a fluid, the method including: providing a container to be filled with a fluid, the container having an opening; providing a nozzle adjacent the opening of the container; providing a valve assembly in fluid communication with the nozzle; providing the fluid to fill the containers to the valve assembly, the valve assembly including a fluid inlet orifice in fluid communication with a source of the fluid, the fluid inlet orifice allowing the fluid to flow in the direction of fluid flow from the source of the fluid into the fluid flow path of the valve assembly; a fluid outlet orifice in fluid communication with the fluid flow path of the valve assembly and through which the fluid may flow out of the valve assembly; a first valve in fluid communication with the fluid inlet and having a first valve open configuration which allows the fluid to flow through the first valve, a first valve closed configuration that prevents fluid from flowing past the first valve, and a first stopping structure; and a second valve in fluid communication with the first valve and the fluid outlet orifice, the second valve having a second valve open configuration which allows the fluid to flow through the second valve, a second valve closed configuration that prevents fluid from flowing past the second valve and a second stopping structure, wherein the first valve and the second valve are separated from each other by a reservoir region; closing the first valve at a first predetermined time by moving it from the first valve open configuration to the first valve closed configuration to temporarily cut off the source of the fluid; and closing the second valve at a second predetermined time that is after the first predetermined time by moving the second stopping structure direction that is generally perpendicular to the direction of fluid flow at a location where the second valve intercepts the fluid flow path or rotating the stopping structure about an axis or rotation that is generally perpendicular to the direction of fluid flow at a location where the second valve intercepts the fluid flow path from the second valve open configuration to the second valve closed configuration in order to prevent the fluid in the fluid flow path from exiting the fluid outlet orifice.

DETAILED DESCRIPTION OF THE INVENTION

The following description is intended to provide a general description of the invention along with specific examples to help the reader. The description should not be taken as limiting in any way as other features, combinations of features and embodiments are contemplated by the inventors. Further, the particular embodiments set forth herein are intended to be exemplary of the various features of the invention. As such, it is fully contemplated that features of any of the embodiments described can be combined with or replaced by features of other embodiments, or removed, to provide alternative or additional embodiments within the scope of the invention.

The low splash fluid shutoff valve assembly of the present invention may be used in high-speed container filling operations, such as high-speed bottle filling. It should be understood, however, that other types of containers are contemplated, including, but not limited to boxes, cups, cans, vials, single unit dose containers such as, for example soluble unit dose pods, pouches, bags, etc., and that the speed of the filling line should not be considered limiting. Further, without being bound by theory, it is believed that the splashing in conventional filling lines is created by one or more factors, including, for example, the reduction in the cross-sectional area in the fluid flow path as the fluid shutoff valve closes and/or the quick movement of the valve in the direction of the fluid flow to close the valve and shutoff the fluid flow. By reducing the amount or intensity of the splash-back, filling can be done at higher speeds and/or with higher accuracy, and may provide other benefits such as better hygiene, less wasted product and/or packaging, etc.

Figure 1:
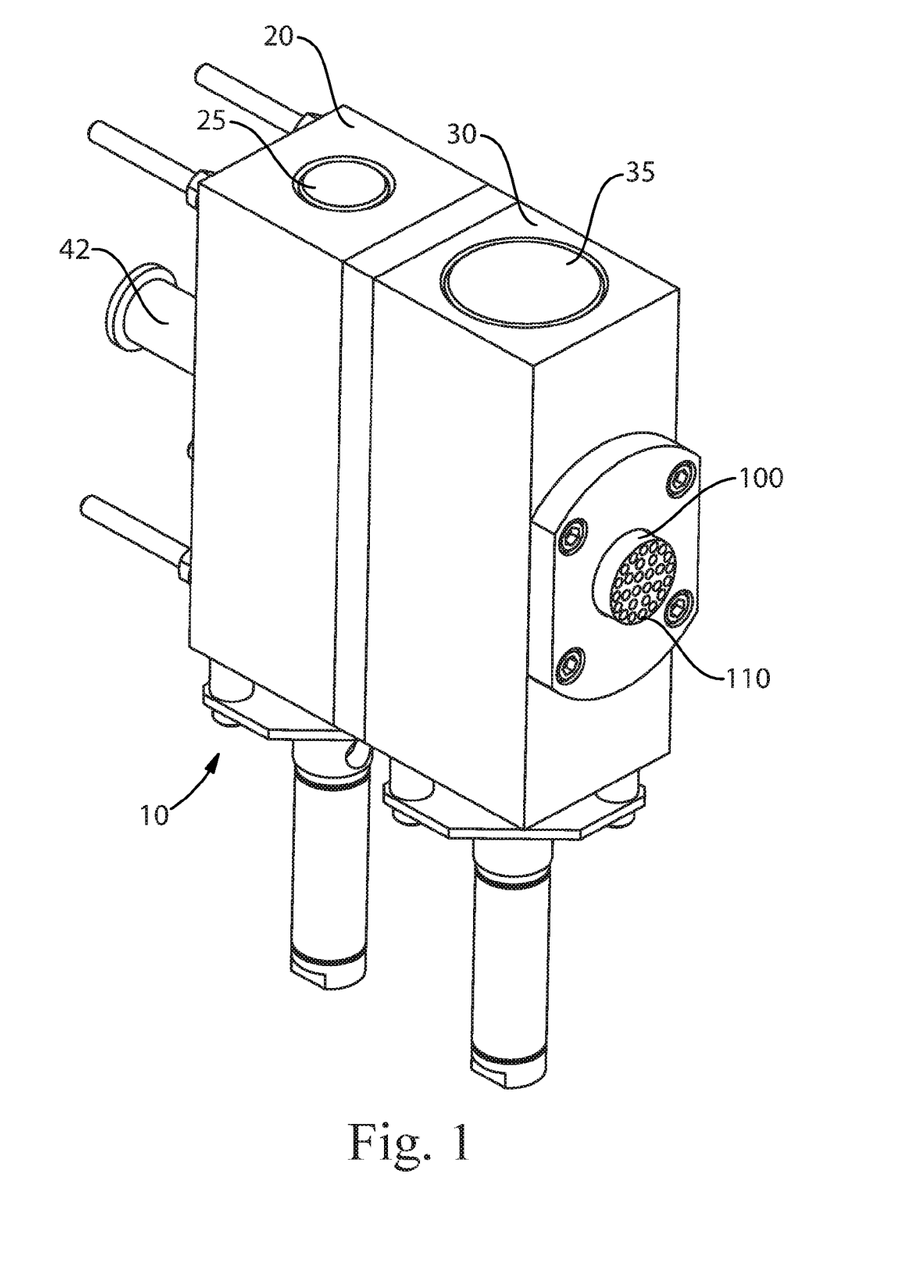
FIG. 1 is a perspective view of one exemplary embodiment of the shutoff valve assembly of the present invention.

FIG. 1 is an isometric view of one example of a low splash fluid shutoff valve assembly 10 that may be used in container filling operations, such as high-speed bottle filling. The low splash fluid shut off valve assembly 10 shown includes a first valve component 20 having a first valve 25. The first valve 25 has a first stopping structure 26 (shown in FIGS. 2-4). The shutoff valve assembly 10 shown also includes a second valve component 30 having a fluid shutoff valve such as second valve 35. The second valve 35 has a second stopping structure 36 (shown in FIGS. 2-4). The first valve 25 and the second valve 35 are in fluid communication with each other.

Figure 2:
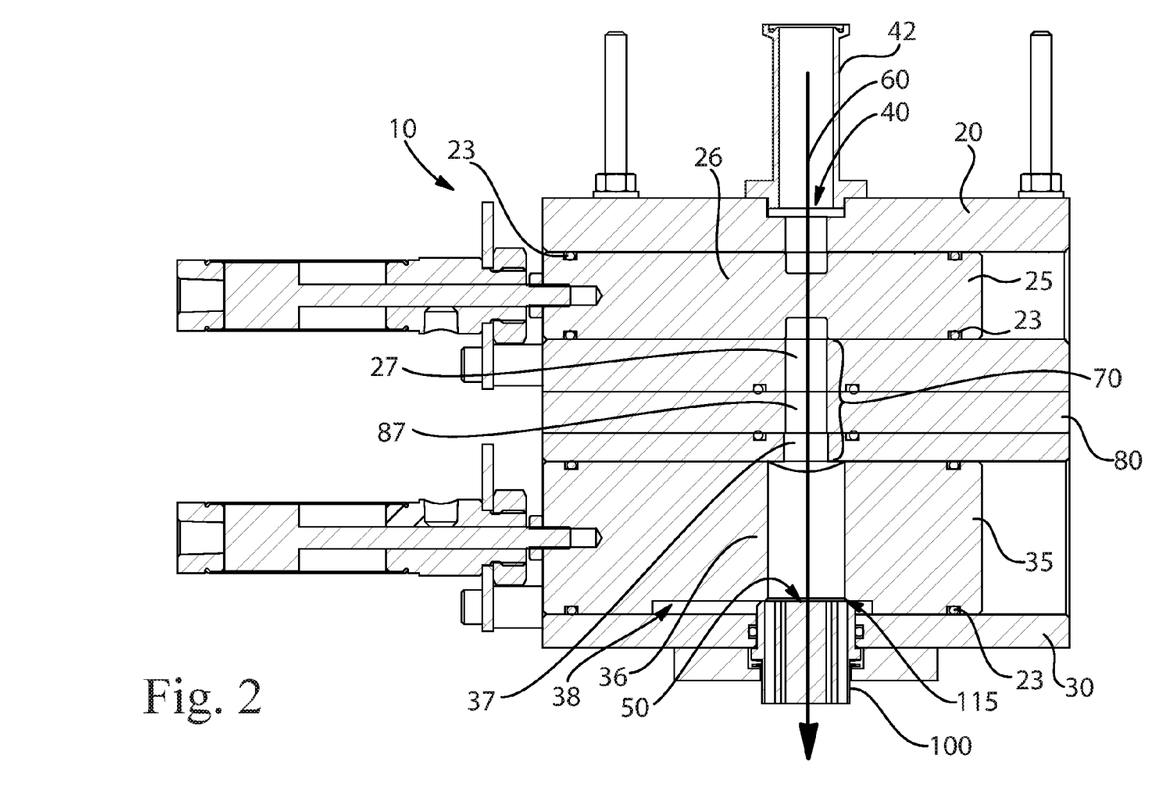
FIG. 2 is a cross-sectional view of one exemplary embodiment of the shutoff valve assembly of the present invention.

The low splash fluid shutoff valve assembly 10 shown in FIG. 2 also includes a fluid inlet orifice 40 and a fluid exit orifice 50. The fluid inlet orifice 40 is disposed adjacent the first valve 25 and may be part of the first valve component 20 or a separate piece permanently or temporarily fixed thereto. The fluid inlet orifice 40 is the location where the fluid 45 (shown in FIG. 9) passing through the shutoff valve assembly 10 enters the shutoff valve assembly 10 from the fluid source 42. The fluid 45 may be pressurized or provided at a pressure that is greater than atmospheric pressure. Once entering the shutoff valve assembly 10, the fluid 45 flows along a fluid flow path 60 through the first valve component 20 to the first valve 25. If the first valve 25 is in an open configuration, as shown in FIG. 2, the fluid 45 will pass through the valve 25 and continue along the fluid flow path 60 into a reservoir region 70 between the first valve 25 and the second valve 35. Upon reaching the second valve 35, the fluid 45 will either pass through the second valve 35 or be prevented from passing through by the second stopping structure 36 of the second valve 35.

As used herein, the term "pass through" in reference to a valve is intended to be a broad reference to fluid moving past the stopping structure of a valve as intended when the valve is in an open configuration. Thus, the term encompasses any intended movement of fluid from the inlet of a valve to an outlet of the valve past the stopping structure of the valve. The term is not tended to be limited to situations where the fluid only passes within the stopping structure of the valve itself, but rather, includes fluid passing through the stopping structure, around the stopping structure, over the stopping structure, within the stopping structure, outside of the stopping structure, etc. or any combination thereof.

Figure 3:
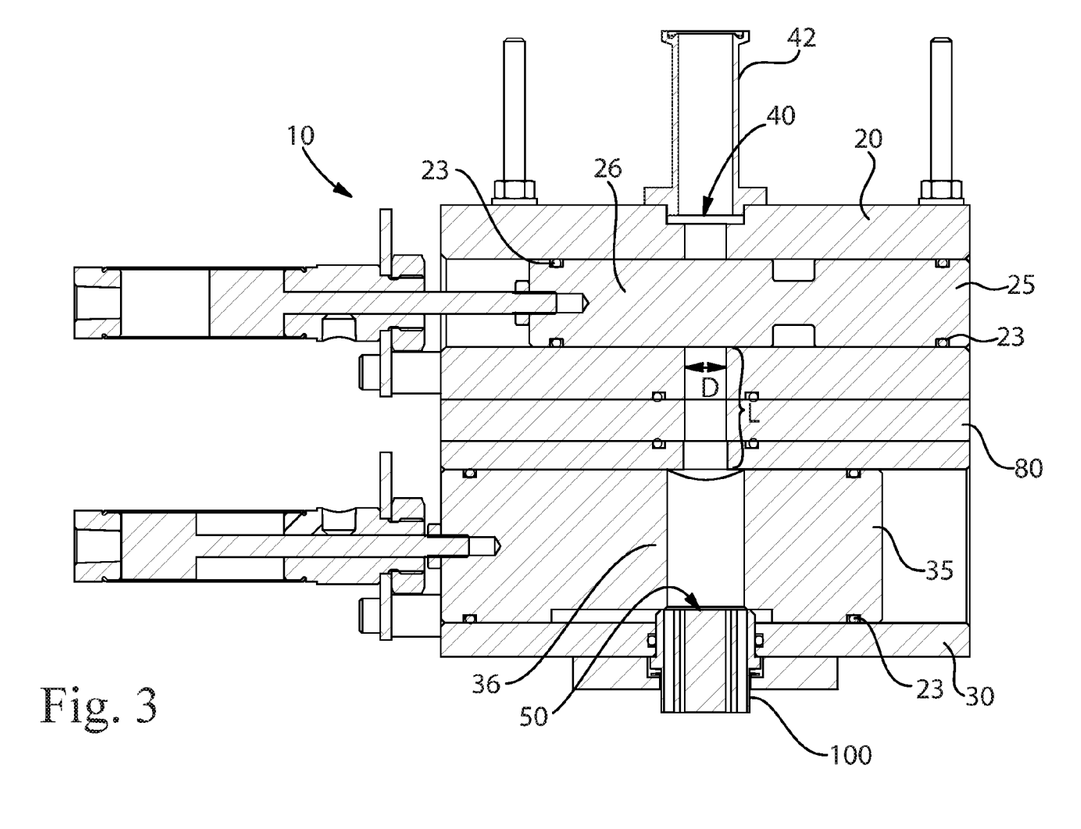
FIG. 3 is a cross-sectional view of one exemplary embodiment of the shutoff valve assembly of the present invention.
Figure 4:
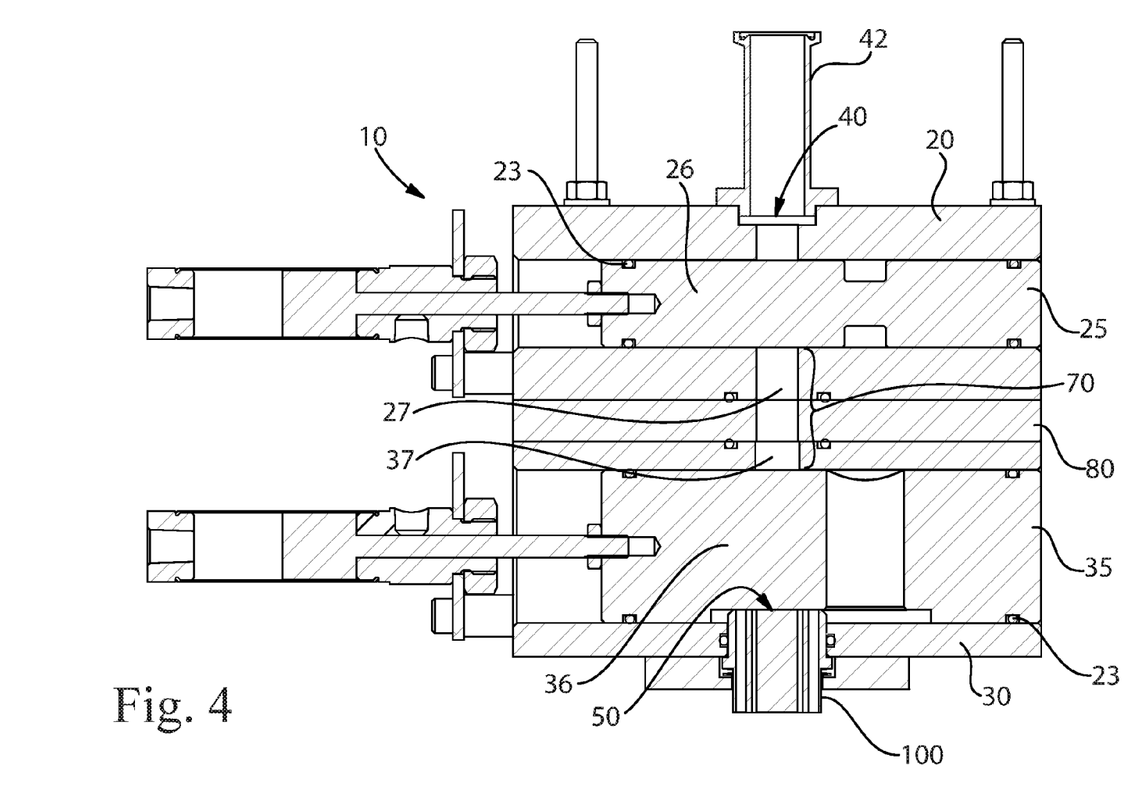
FIG. 4 is a cross-sectional view of one exemplary embodiment of the shutoff valve assembly of the present invention.

As shown in FIGS. 2-4, the second valve component 30 is configured such that the second valve 35 is in fluid communication with the first valve 25 and the fluid exit orifice 50. As such, the second valve component 30 can be used to prevent fluid 45 from exiting the shutoff valve assembly 10, as desired. In FIG. 2, the second valve 35 is shown in an open configuration that will allow the fluid 45 to pass through the valve 35 and out of the shutoff valve assembly 10. In FIG. 3, the first valve 25 is shown in a closed configuration and the second valve 35 is shown in an open configuration. In this configuration, the second valve 35 is isolated from the fluid source 42 from which the fluid 45 is provided into the valve assembly 10, but the second valve 35 is still open to allow fluid 45 to pass out of the valve assembly 10. In FIG. 4, the second valve 35 is shown in a closed configuration where the second stopping structure 36 prevents the fluid 45 from passing through the second valve 35 and out of the valve assembly 10.

For simplicity, the figures only depict certain exemplary types of valves. However, it is to be understood that any suitable valve can be used in the shutoff valve assembly 10. For example, the first valve 25 and the second valve 35 may be ball valves, spool valves, rotary valves, sliding valves, wedge valves, butterfly valves, choke valves, diaphragm valves, gate-type valves, needle pinch valves, piston valves, plug valves, poppet valves and any other type of valve suitable for the particular use intended for the shutoff valve assembly 10. Further, the shutoff valve assembly 10 may include any number of valves and the valves may be the same type, different or a combination thereof. The valves may be any desired size and need not be the same size. Examples of valves that have been found suitable for use in the shutoff valve assembly 10, for example, to fill bottles with soap, such as hand dish soap having a viscosity of around 300 centipoise and liquid laundry detergent having a viscosity of around 600 centipoise, are piston, spool and rotary valves.

The valves may be driven, actuated and/or controlled by any suitable drivers and/or controllers, including, but not limited to air or pneumatic drivers, servos, hydraulics, magnetic, cams and other mechanical drivers, etc. or combinations thereof. Further, the valves may be controlled manually or by means of a computer or other controlling device. As shown in FIGS. 2-4, the valves 25 and 35 are driven by independent pneumatic cylinders 44. However, any number of valves may be driven or controlled by a single actuator can be coupled together mechanically, electronically or otherwise to be driven or controlled by any number or drivers and/or controllers. One exemplary servo driver is an electrical cylinder actuator (e.g. CBL50-025-75-2F-3) available from SMAC Moving Coil Actuators.

As shown in FIGS. 2-4, valves 25 and 35, are piston valves and may include one or more seals 23. The seals 23 provide a sealing mechanism to ensure that the fluid 45 does not seep out of the valve along the stopping mechanism. The seals 23 may be any suitable size and/or shape and may be made from any suitable material. Further, each valve may include any number of seals 23. In the embodiment shown, each valve includes two seals 23, one at each end of the stopping mechanism 26, 36. One example of a suitable seal 23 is an o-ring, such as an extreme chemical Viton Etp O-ring Dash number 13 available from McMaster-Carr.

If piston valves are used, the valves may be any suitable size or shape. For example, the valve 25 may be a cylinder or cylinder-like. The valve may have a cylindrical shape with a portion necked down to allow the fluid to pass around it, similar to valve 25. Alternatively, the valve may be similar to valve 35, having a cylindrical shape having one or more channels extending through the cylinder, the channel(s) allowing the fluid to pass through it. Of course, other suitable valves can be used. Further, the valve or any portions of the valves can be made out of any material suitable for the purpose of the valve. For example, the valve may be made out of steel, plastic, aluminum, ceramics, layers of different materials, etc. One embodiment that has been found to be suitable for use with fluids, such as hand dish detergent liquids having viscosities between about 200 and about 6000 centipoise is a ceramic material AmAlOx 68 (99.8% aluminum oxide ceramic) available from Astro Met, Inc, 9974 Springfield Pike, Cincinnati, Ohio. One advantage of ceramic materials is that they can be formed with very close tolerances and may not need additional seals or other sealing structures to prevent fluid 45 from escaping the valve. Reducing the number of seals can also reduce the spaces into which microbes can find their way and live, which can help improve the hygiene of the process.

In embodiments where two or more valves are incorporated into the shutoff valve assembly 10, it has been found to be advantageous to separate at least the valve disposed closest to the fluid outlet orifice 50 of the shutoff valve assembly 10, in terms of the fluid flow path 60, from other valves in the shutoff valve assembly 10. Without being bound by theory, it is believed that providing a distance between the valves can act as a buffer between the fluid flow entering the shutoff valve assembly 10 and final valve before the fluid 45 exits the shutoff valve assembly 10. In FIGS. 2-4, the first valve 25 is separated from the second valve 35 by reservoir region 70.

As shown in FIGS. 2-4, the reservoir region 70 is the portion of the fluid flow path 60 located between the first valve 25 and the second valve 35. In single-valve embodiments, the reservoir region 70 is located between the valve and the outlet orifice 50. The reservoir region 70 provides a space for fluid 45 to remain when either or both the first valve 25 and the second valve 35 are closed. The reservoir region 70 can be any desired size, shape or dimension. As shown in FIGS. 2-4, the reservoir region 70 may include an exit portion 27 of the first valve component 20 and an inlet portion 37 of the second valve component 30. Also, as shown in FIGS. 2-4, the reservoir region 70 may include a spacing channel 87. The spacing channel 87 may be any suitable structure for allowing fluid to pass therethrough. As shown in FIGS. 2-4, the spacing channel 87 may be an opening in a spacer, such as spacing element 80, that includes structure to space apart the first valve component 20 and the second valve component 30. However, the spacing channel 87 may also be a tube, hose, pipe, line, conduit, channel, duct or the like that connects the exit portion 27 of the first valve component 25 to the inlet portion 37 of the second valve component 30 to complete the fluid flow path 60. Additionally or alternatively, such as, for example, in single valve configurations, the spacing channel 87 may be disposed downstream of the final valve in the shutoff valve assembly 10 so as to provide space between the final valve and any downstream structure, such as, for example, a nozzle 100.

As noted above, the reservoir region 70 can be any desired size, shape or dimension. However, it may be desirable for the reservoir region 70 to have a predetermined length, diameter and/or volume. For example, it may be desirable for the length L (e.g. shown in FIG. 3) of the reservoir region 70 to be at least about 50 mm, at least about 10 mm or at least about 5 mm. Alternatively or in addition, it may be desirable for the length L of the reservoir region 70 to be at least about 25%, at least about 50%, or at least about 100% of the diameter D of the reservoir region 70. Alternatively or additionally, it may be desirable for the diameter D of the reservoir region 70 to be less than 100% of the length L of the reservoir region, less than 75% of the length L of the reservoir region, or less than about 50% of the length L of the reservoir region 70. Alternatively or in addition, it may be desirable for the volume of the reservoir region 70 to be at least about at least about 200,000 $cm^3$, or at least about 30,000 $mm^3$, at least about 150 $mm^3$, or at least about 35 $mm^3$.

It may be desirable for the length L, diameter D and/or volume of the reservoir region 70 be increased as the velocity increases and/or viscosity of the fluid 45 decreases. This is because an increase in velocity and/or decrease in viscosity of the fluid 45 can create more and/or larger splash-back. Further, without being bound by theory, it is believed that the length L and the diameter D of the reservoir region 70 may impact the difference in shutoff timing between the pressure isolation valve (e.g. valve 25) and the fluid shutoff valve (e.g. valve 35). For example, as the length L of the reservoir region 70 increases, there is more time to shut the fluid shutoff valve after the pressure isolation valve is shut without risking a pressure surge out of the valve assembly 10.

The reservoir region 70 may also be static or variable in dimensions. That is, it can have set dimensions such as length, width, height, diameter, volume, etc. or can have dimensions that can change. For example, it may be desirable that the reservoir region 70 is a fixed portion of tubing with a certain diameter located between the first valve portion 20 and the second valve portion 30. Alternatively, the reservoir region 70 can be created by moving all or a portion of the first valve portion 20 in relation to the second valve portion 30. As such, the dimensions of the reservoir region 70 can be changed. One way to change the volume of the reservoir region 70 is to configure the first valve 25 to move in a direction generally parallel, but opposite to the fluid flow path 60 when it closes. In doing so, the valve 25 can create more volume in the reservoir region 70 than when the valve 25 is open. The term "generally parallel to, but opposite to the fluid flow path" refers to a direction that is exactly opposite (i.e. 180 degrees) from the fluid flow path 60 or up to about 45 degrees greater than or less than exactly opposite to the fluid flow path 60. It is to be understood that all angles in the range of −45 degrees to 45 degrees from the fluid flow path 60 are contemplated and specifically set forth herein. This added volume in the reservoir region 70 when the valve 25 is closed can help reduce the pressure of the fluid 45 in the reservoir region 70 and may provide the additional benefit of helping reduce splash-back when used in conjunction with one or more other valves.

Other ways to increase or decrease the volume of the reservoir region 70 include incorporating one or more pistons, bladders, valves or other moveable structures in fluid communication with the reservoir region 70 that can move or change shape, as desired, to increase or decrease the volume of the reservoir region 70. Likewise, in single-valve embodiments, the valve can be configured to move generally parallel, but opposite to the direction of the fluid flow 60 to create or add to the volume of the reservoir region 70. In any of these configurations, changing the volume of the reservoir region 70 can help prevent splash-back and/or dripping from the fluid exit orifice 50 of the shutoff valve assembly 10 and/or nozzle 100.

Figure 5:
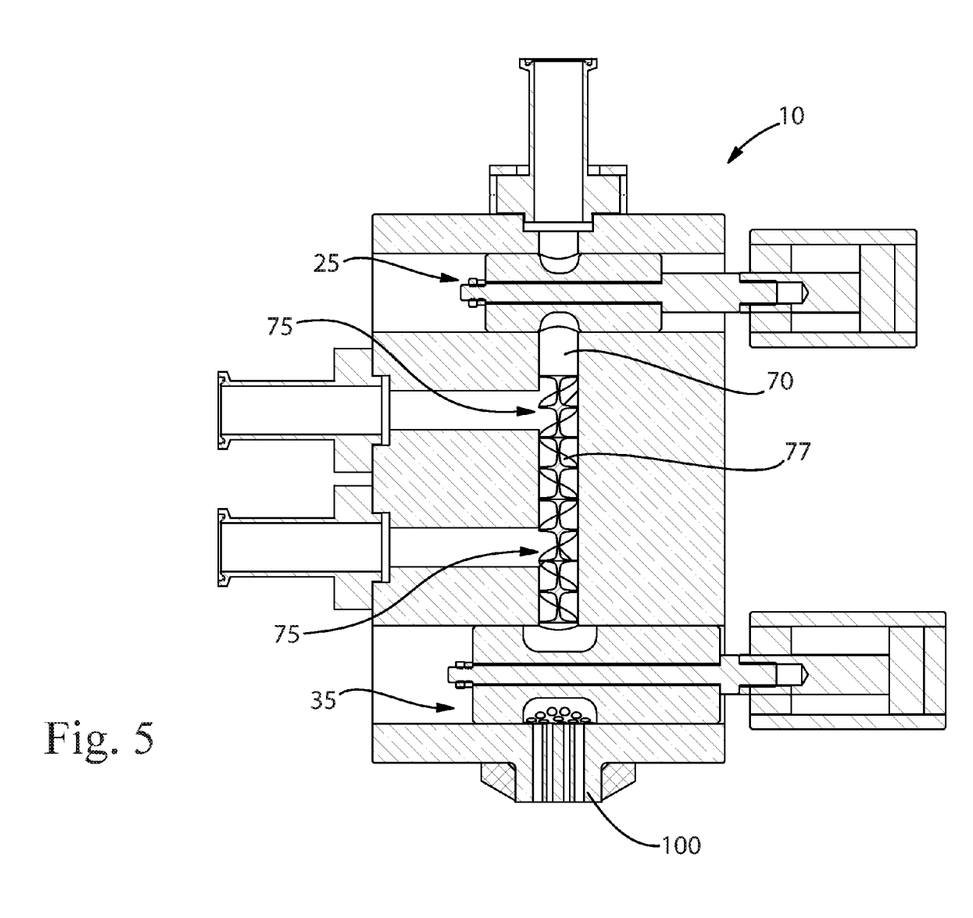
FIG. 5 is a plan view of one exemplary embodiment of the shutoff valve assembly of the present invention.

The reservoir region 70 may also include one or more mixing ports 75 and one or more static or dynamic mixers 77 (e.g. as shown in FIG. 5) to provide for the addition of ingredients to be mixed with or into the fluid 45. For example, the fluid 45 could be a base material (e.g. water), formulation or a pre-mixed composition into which it is desired to add one or more ingredients. The reservoir region 70 may provide a desirable location to add ingredients to the fluid 45 entering the shutoff valve assembly 10 because the fluid flow can be reduced or stopped in the reservoir region 70 for a predetermined period of time. This time can allow time for addition of the ingredients, mixing and/or residence time for the materials to fully mix or react with each other. Also, the reservoir region 70 can provide for more accurate addition of materials to the fluid because the specific volume of the fluid 45 in the reservoir region 70 can be fixed and is less susceptible to variation than an ongoing stream of fluid 45. Further still, the reservoir region 70 can provide a suitable location to mix ingredients just before filling the containers, which can provide flexibility in the filling operation and allow for late stage differentiation of the end product. For example, an operator could choose to add different ingredients to a base formulation just before it is released into the container. This can prevent contamination of upstream equipment with the additional ingredients and can allow for different products with the same base formulation to be produced on the same manufacturing line. It is also contemplated that addition or mixing of ingredients can take place when one or more of the valves is open. For example, mixing in the reservoir region 70 can take place even when the fluid 45 is flowing through the valve assembly. In any case, a mixing pump or other means for providing materials through the mixing port 75 and into the reservoir region 70 can be timed or otherwise controlled to be coordinated with, or driven by one or more valves of the valve assembly 10.

As shown in FIGS. 1-4, a spout or other fluid directing or control structure, such as nozzle 100, may be disposed adjacent the exit orifice 50 of the shutoff valve assembly 10. As used herein, the term "nozzle" is not intended to be limited to a particular structure or element, but rather, is intended to designate generally the final orifice or orifices that the fluid 45 flows through before entering the container it is intended to fill. The nozzle 100 may include any number of orifices 110 or other openings through which fluid 45 may flow. In FIGS. 1-4, the nozzle 100 shown includes several orifices 110 that are generally circular in cross-section, but other shapes, numbers of orifices and sizes are contemplated. Also, the nozzle 100 need not be a single nozzle, but may include one or more nozzles that are separate or joined together. The shape and/or orientation of the nozzle 100 can be static or dynamic. It is also contemplated that the shutoff valve assembly 10 and/or nozzles may be configured such that different nozzles can be used with the shutoff valve assembly 10, allowing the operator to choose between different nozzle types depending on the particular filling operation.

The nozzle 10 can also be manufactured as part of the valve assembly 10 or any one or more of the valve components. This can reduce the number of seals needed between parts, which can be especially useful when filling containers with fluids that include ingredients, such as perfumes, that can degrade or compromise seal integrity. Such configurations can also help reduce or eliminate locations where microbes, sediment and/or solids can get trapped.

FIGS. 2-4 show examples of how two valves, first valve 25 and second valve 35 can be configured and operated in the shutoff valve assembly 10 to provide low splash-back when the second valve 35 is closed. Specifically, as shown in FIG. 2, the first valve 25 and the second valve 35 are both in an open configuration providing an uninterrupted fluid flow path 60 from the inlet orifice 40 to the exit orifice 50. In FIG. 3, the shutoff valve assembly 10 is shown in a configuration where the first valve 25 is in a closed configuration and the second valve 35 is shown in an open configuration. Thus, the fluid flow path 60 is interrupted at the first valve 25. If the shutoff valve assembly 10 is being used in a system wherein the fluid 45 passing through the shutoff valve assembly 10 is under pressure, closing the first valve 25 will separate the reservoir region 70 and any fluid 45 disposed in the system downstream of the first valve 25 from the fluid 45 under pressure. This allows the reservoir region 70 to act as a buffer zone for the fluid 45 just upstream of the second valve 35. As such, the pressure and/or velocity of the fluid 45 in the reservoir region 70 can be reduced versus the velocity and/or pressure of the fluid 45 in the reservoir region 70 when the first valve 25 is open. This allows the second valve 35 to close without creating a surge of fluid 45 out of the nozzle 100 and into the container 120 to be filled, which, in turn, can significantly reduce or eliminate splashing of the fluid 45 out of the container 120 at the end of the fill cycle (i.e. when the final valve is shut to end the filling operation for any particular container).

Although many different types of valves can be incorporated into the shutoff valve assembly 10, valves that use a shearing motion to stop the fluid 45 that is flowing along the fluid flow path 60 have been found to be especially useful to reduce the amount of splash-back experienced when shutting the valve. Shearing the fluid 45 rather than stopping it by movement of portions of the valve in the direction of the fluid flow can reduce the amount and intensity of splash-back. A shearing motion, as used herein, means to move the stopping mechanism of the valve, such as, for example, valve 25, in a motion that is generally perpendicular to the fluid flow path 60 as it exits the valve 25. The term "generally perpendicular to the fluid flow path" refers to any direction that is exactly perpendicular (i.e. 90 degrees) to the fluid flow path 60 or up to about 45 degrees in any direction from exactly perpendicular to the fluid flow path 60. In certain embodiments, it may be desirable for the valve 25 to move in a direction at least about 50 degrees, at least about 60 degrees, at least about 70 degrees, at least about 75 degrees, at least about 80 degrees or at least about 85 degrees from the fluid flow path 60. Further, it is to be understood that all angles in the range of 45 degrees to 90 degrees from the fluid flow path 60 in any direction are contemplated and specifically set forth herein.

Figure 6:
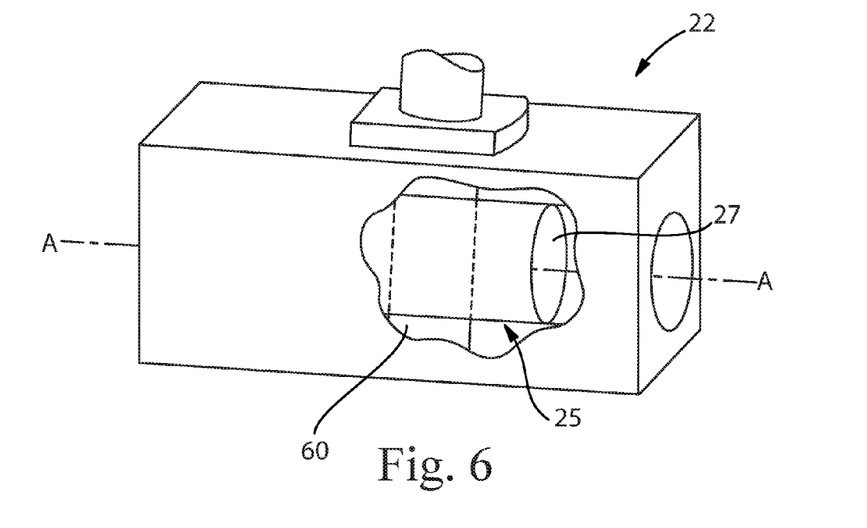
FIG. 6 is an isomeric view of one exemplary embodiment of the shutoff valve assembly of the present invention with portions cut away to show underlying structure.
Figure 7:
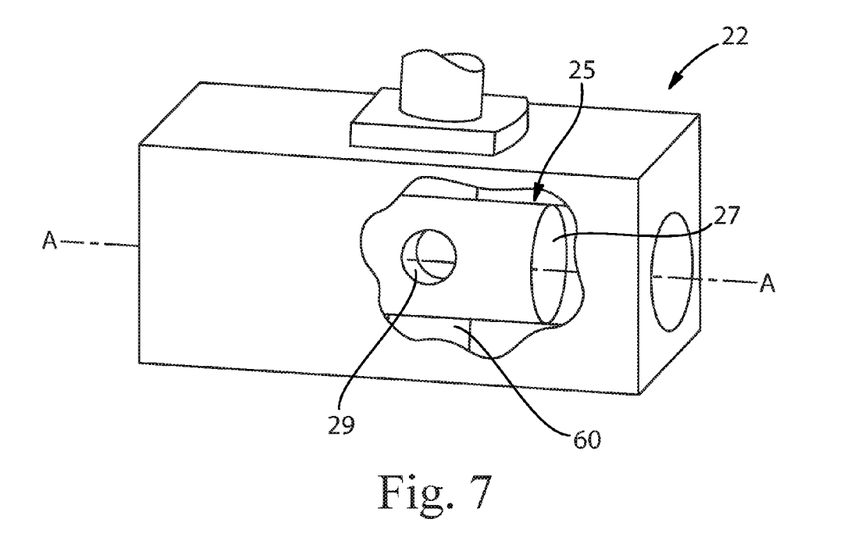
FIG. 7 is an isomeric view of one exemplary embodiment of the shutoff valve assembly of the present invention with portions cut away to show underlying structure.

One way to create a shearing motion is to move the stopping mechanism of a valve in a generally linear motion across the fluid flow path, as is shown in FIGS. 2-4. Alternatively or in addition, a shearing motion can be created by rotating a stopping mechanism that has an opening which can be lined up with the fluid flow path to allow the fluid 45 to flow through or rotate such that the opening is not lined up with the fluid flow path to close the valve. For example, as shown in FIGS. 6 and 7, the valve component 22 includes a valve 25 comprising a stopping mechanism, such as cylinder 27, with a channel 29 therethrough that can be aligned with the fluid flow path 60. The valve 25 is opened by aligning the channel 29 with the fluid flow path 60. To close the valve 25, the cylinder 27 is rotated such that the channel 29 is not aligned with the fluid flow path 60. As shown in the figures, the valve 25 is opened and closed by rotating the cylinder 27 about an axis of rotation A-A. To create the desired shearing motion when closing a rotational valve 25, the axis of rotation A-A should be generally perpendicular to the fluid flow path 60.

In certain embodiments, such as when the fluid outlet orifice 50 is not planar, the motion of the stopping portion of the valve may be at different angles with respect to the fluid flow path 60 across the fluid outlet orifice 50 or corresponding nozzle orifice(s) 110. In such embodiments, it is preferred that at least some portion of the movement of the stopping mechanism is generally perpendicular to the fluid flow path 60. Preferably, at least about 25% of the motion of the stopping portion of the valve is generally perpendicular relative to the fluid flow path 60, at least at least about 50% of the motion of the stopping portion of the valve is generally perpendicular relative to the fluid flow path 60, at least about 75% of the motion of the stopping portion of the valve is generally perpendicular relative to the fluid flow path 60 or at least about 90% of the motion of the stopping portion of the valve is generally perpendicular relative to the fluid flow path 60. For example, in embodiments where the valve is in the form of a cylinder that is rotated about an axis, the above-identified preferred percentages of movement that should be generally perpendicular to the fluid flow path equate to the percentage of the path of rotation that the valve makes from an open configuration to a closed configuration that should be generally perpendicular to the fluid flow path 60.

Regardless of the type of valve that is used, closing the valve can disrupt the fluid flow making it more difficult to control. As such, it may be desirable to design one or more of the valves such that it has a particular shape, or such that it closes at a particular rate or in a particular direction as compared to other valves or structure in the valve assembly to help maintain a more regular fluid flow and to help reduce back-splash. For example, it may be desirable in an assembly including two piston-type valves, to close the valves in generally opposite directions so that any surge that is created by the first valve 25 is blocked by the stopping structure 36 of the second valve 35 as it closes. It may also be desirable to configure the valve assembly 10 such that it includes one or more valves that can partially close to adjust the filling rate rather than merely opening and closing. For example, the first valve 25 could be configured to close partially at some point during the filling cycle to slow the flow rate of the fluid 45. In doing so, it may be able to increase the accuracy of the amount of fluid 45 that is filled into the container. An example would be to close the first valve 25 a predetermined amount, such as, for example about 50%, about 75%, about 90%, about 95% or about 97% to slow the fluid flow velocity, for example, about 90%. Then, once the fluid flow velocity has been reduced, the first valve 25 or the second valve 35 can be closed. By reducing the fluid flow velocity prior to the end of the filling cycle, the amount of variation in the fill volume can be decreased. This can reduce waste, improve quality control, and even help reduce the amount of splash-back experienced at the end of the filling cycle.

In the embodiment shown in FIGS. 2-4, the second valve 35 is adjacent the fluid outlet orifice 50. In such embodiments, it may be desirable for the second valve 35 or associated structure to seal the fluid outlet orifice 50 when the second valve 35 is in a closed configuration. This can help ensure that the fluid 45, if any, remaining in the fluid outlet orifice 50 and/or nozzle 100, will not drip between the end of one filling cycle and the beginning of the next filling cycle. One exemplary way to create a seal between the second valve 35 or corresponding structure and the fluid outlet orifice 50 is to extend the nozzle 100 through the outlet orifice 50 such that it is located against the structure of the valve, such as valve component 35, as shown in FIGS. 2-4. If this is done, it may be desirable to coordinate the shape of the inlet surface 115 (shown in FIG. 2) outlet surface 38 (shown in FIG. 2) of the valve component 35 such that the two parts fit together closely, at least along the inlet surface 115 of the nozzle 100 including the orifice(s) 110. For example, if the valve component 35 is cylindrical, the inlet surface 115 of the nozzle 100 may be curved to match the curved shape of the valve component 35. In addition or alternatively, the nozzle 100 can be biased against the valve component 35 by any suitable means, including, for example spring 105. One particular spring that has found to be suitable is a Smalley C125 L1 wave spring configured to push the nozzle against the valve component 35. Other biasing means can also be used, including but not limited to elastomeric materials, pressure, magnetics, cams, levers and the like. Yet another way to create a seal is manufacture the components of the valve to have tolerances less than about 0.0001 inches. This fit is generally tight enough to provide a liquid tight seal at operating pressures up to about 100 psi. Of course, other tolerances may be suitable depending on the fluid 45 characteristics and any needs or desires for the particular filling process.

As noted above, the shutoff valve assembly 10 may include a valve or other structure that expands the volume of the reservoir region 70. It may also include structure that provides a vacuum to the reservoir region 70 or provides negative pressure in the reservoir region 70 to help reduce the pressure of the fluid 45 in the reservoir region 70. The addition of such a feature in the valve assembly 10 may help reduce splash-back, dripping and/or stringing of the fluid 45 out of the valve assembly 10 or nozzle 100. One example of a valve assembly 10 that includes such a drip-reduction feature is described above and includes a valve that moves in a direction generally parallel to, but opposite to the fluid flow path 60 when it closes. Another exemplary embodiment is shown in FIG. 8.

Figure 8:
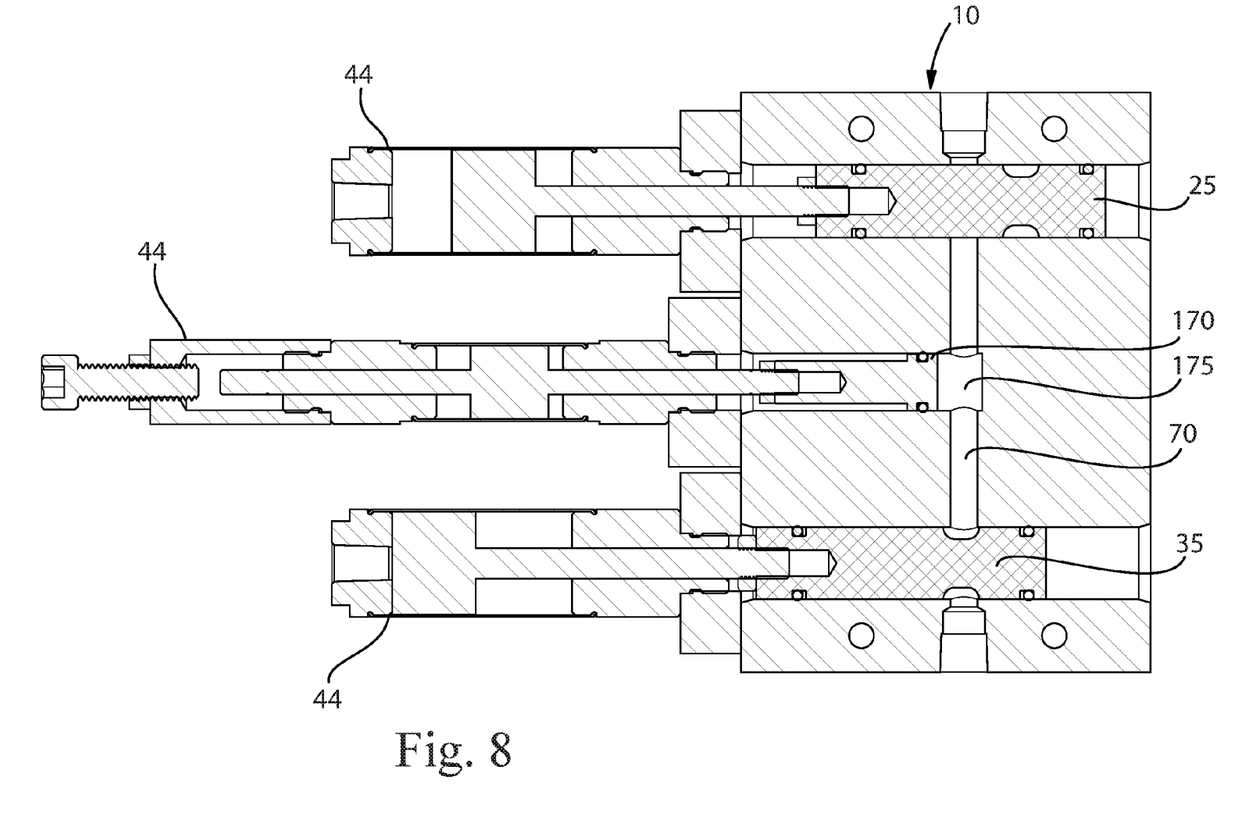
FIG. 8 is a cross-sectional view of one exemplary embodiment of the shutoff valve assembly of the present invention.

As shown in FIG. 8, the valve assembly 10 includes a first valve 25 and a second valve 35 in fluid communication with each other. Reservoir region 70 extends between the first valve 25 and the second valve 35. A vacuum piston 170 is disposed between the first valve 25 and the second valve 35 and is in fluid communication with the reservoir region 70. Specifically, the piston 170 is disposed in a vacuum channel 175 that opens into (is in fluid communication with) reservoir region 70. As such, when the piston 170 is moved in a direction away from the reservoir region 70, the vacuum channel 175 lengthens and increases in volume. Because the fluid flow path 60 is a closed system in this embodiment, the increase in volume acts to provide a vacuum, or at least negative pressure, to the reservoir region 70. When configured properly, the addition of negative pressure or a vacuum to the reservoir region 70 prior to the second valve 35 closing, can pull the fluid 45 back into the nozzle 100 and prevent it from dripping or stringing, as some viscous fluids may do between filling cycles.

Reducing or eliminating the splash-back, stringing and/or dripping at the end of the filling cycle can provide numerous benefits, including but not limited to reducing the amount of fluid that is wasted due to its splashing out of the container 120. Further, reducing splash-back, stringing and/or dripping can help the improve hygiene of the process by keeping the fluid 45 controlled and in the fluid flow path 60 or in the container. Thus, the fluid 45 will be less likely to be exposed to the environment, get on the filling or other equipment, or splash onto workers. Additionally, a reduction in splash-back can allow for more accurate filling and less head space in the containers, thus, reduce material, shipping, and storage costs and provide a more full looking container for the consumer. Further still, reducing splash-back as set forth herein can provide the opportunity to speed up production lines because the fluid 45 can be filled into the container at a higher velocity, increased volume per unit of time and/or decreased string time. Yet other benefits include keeping the fluid in the container and out of areas that could negatively affect the performance of the container. For example, some fluids may prevent a proper seal from being created between the container and the lid. In other situations, such as filling unit dose "pods", splashing, stringing and/or dripping fluid can contaminate the sealing region between the layers of material that surround the ingredient of the unit dose product, which can, for example, cause a leak, prevent sealing or reduce the seal strength in that region. The above mentioned benefits, and others, can be accomplished by the present invention individually or in any combination, as desired.

Figure 9:
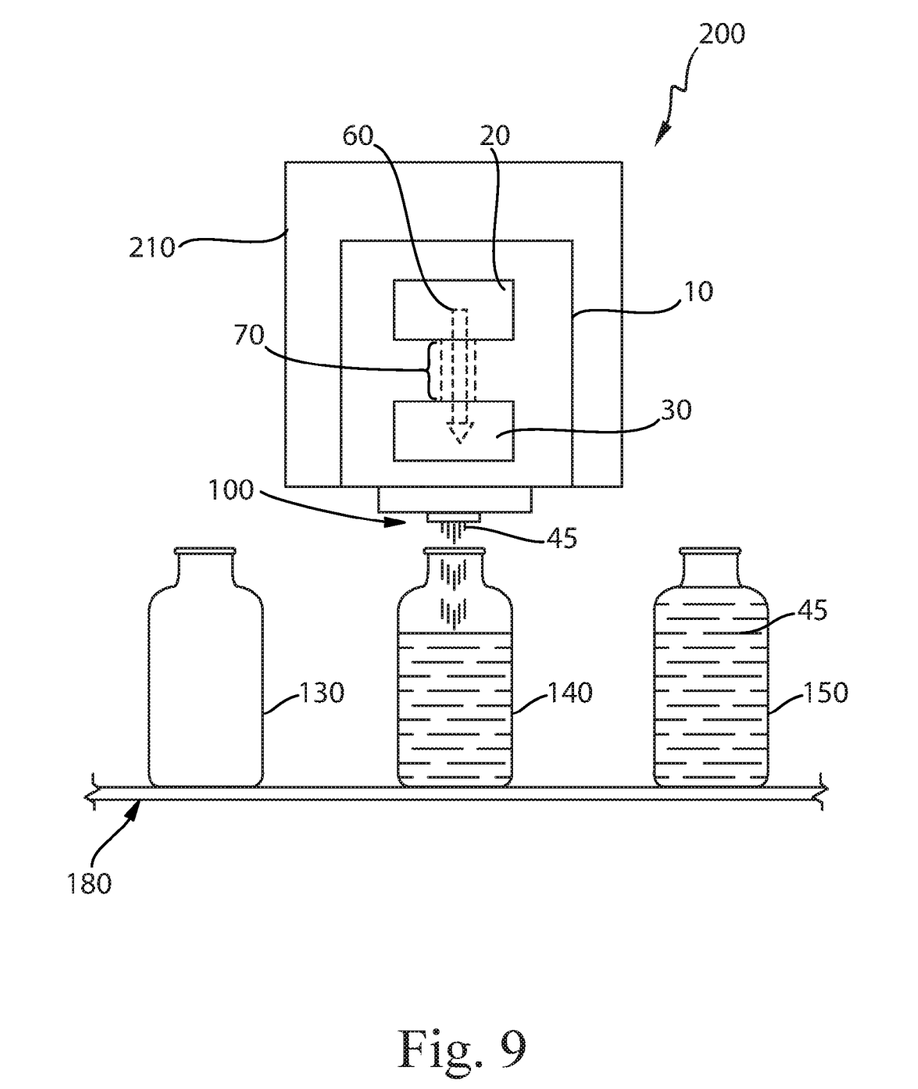
FIG. 9 is a plan view of one exemplary embodiment of the shutoff valve assembly of the present invention in a bottle filling line.

FIG. 9 shows an example of a container filling operation 200 that could be used in a manufacturing line. The filling operation 200 includes a container filling apparatus 210 that includes the low splash fluid shutoff valve assembly 10. Empty containers, such as, for example, bottle 130, are provided and placed adjacent the nozzle 100 of the container filling apparatus 210. As shown in the figure, the nozzle 100 may be located adjacent the opening 135 of the bottle 140 but still completely outside of the bottle 140 during the filing process, or may be positioned fully or partly within the bottle 140 through the opening 135. The process and apparatus of the present invention are particularly helpful to reduce back-splash and other potential negatives associated with quickly opening and closing valves when the nozzle 100 is located above the surface of fluid 45 in the bottle 140 as it is being filled, as well as situations where the nozzle 100 is disposed outside of the bottle 140 being filled at all times during the filling process.

The bottles 130 may be provided by means of a conveyor belt, such as conveyor belt 180, or any other means suitable for supplying the containers. The first valve 25 of the first valve component 20 is opened to allow fluid 45 to flow into the reservoir region 70. The second valve 35 of the second valve component 30 is opened to allow the fluid 45 to flow through the nozzle 100 into the bottle 140. As the bottle 140 nears the desired fill level, the first valve 25 is closed shutting off the fluid flow path 60 just upstream of the reservoir region 70. The second valve 35 is then closed at an appropriate time to allow the bottle 140 to be filled to the desired level. The amount of time between when the first valve 25 is closed and the second valve 35 is closed can be chosen based on the specifics of the filling operation and the desired results. It may be desirable for the first valve 25 to close at least about 0.1 ms before the second valve 35, between about 0.1 ms and about 10 seconds before the second valve 35, greater than or about 1 second before the second valve 35, or more than about 10 seconds before the second valve 35. Once filled, the bottle, now filled bottle 150, is moved away from the filling operation 200 and can be further processed, as desired.

The filling operations 200 described herein are intended to be merely examples of filling operations that could include the low splash fluid shutoff valve assembly 10 of the present invention. They are not intended to be limiting in any way. It is fully contemplated that other filling operations could be used with the low splash fluid shutoff valve assembly 10 of the present invention, including but not limited to operations where more than one container is filled at one time, where containers other than bottles are filled, where different shape and/or size containers are filled, where containers are filled in different orientations than shown in the figure, where different filling levels are chosen and/or varied among containers, and where additional steps take place during the filling operation, such as, for example capping, washing, labeling, weighing, mixing, carbonating, heating, cooling, and/or radiating, etc. Further, the number of valves shown or described, their proximity to each other and other components of the filling apparatus 210 or any other equipment is not intended to be limiting, but merely exemplary. Also, the order of operations and how and when the valves are open and closed is not intended to be limiting, but rather an example of how the present invention could be incorporated into a filling operation such as filling operation 200.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm." Further, where ranges or alternative units are set forth to describe particular embodiments, it should be understood that every integer within the range is disclosed and that any range between any such integers is contemplated and disclosed.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fluid shutoff valve assembly for a fluid filling line, the valve assembly having a fluid flow path defining a direction of fluid flow, the assembly comprising:
    a fluid inlet orifice in fluid communication with a source of a fluid, the fluid inlet orifice allowing the fluid to flow in the direction of fluid flow from the source of the fluid into the fluid flow path of the valve assembly, wherein the fluid entering into the fluid inlet orifice is at a pressure greater than atmospheric pressure;
    a fluid outlet orifice in fluid communication with the fluid flow path of the valve assembly and through which the fluid may flow out of the valve assembly;
    a fluid shutoff valve in fluid communication with the fluid inlet orifice and the fluid outlet orifice, the fluid shutoff valve having a fluid blocking portion and a fluid flow-through portion, the fluid shutoff valve being moveable from a filling position wherein the fluid flow-through portion is aligned with the fluid flow path to a closed position wherein the fluid blocking portion is aligned with the fluid flow path, wherein the fluid shutoff valve is oriented such that the fluid shutoff valve moves in a direction that is generally perpendicular to the direction of fluid flow at a location where the fluid shutoff valve intercepts the fluid flow path; and
    a pressure isolation valve in addition to the fluid shutoff valve, the pressure isolation valve being located upstream of the fluid shutoff valve and configured to shut off the source of fluid from the fluid flow path while the fluid shutoff valve is in at least a partially open configuration, wherein the pressure isolation valve is configured to close before the fluid shutoff valve.

2. The fluid shutoff valve assembly of claim 1 wherein the fluid shutoff valve is a piston-type valve.

3. The fluid shutoff valve assembly of claim 1 wherein the fluid shutoff valve is a rotating valve and the rotating valve has an axis of rotation that is generally perpendicular to the fluid flow path.

4. The fluid shutoff valve assembly of claim 1 wherein the fluid shutoff valve is oriented such that the fluid shutoff valve moves in a direction that is at least about 60 degrees different from the direction of fluid flow.

5. The fluid shutoff valve of claim 1 wherein the fluid flow path includes a reservoir region between the pressure isolation valve and the fluid shutoff valve along the fluid flow path.

6. The fluid shutoff valve assembly of claim 5 wherein the reservoir region has a length between 5 mm and 500 cm.

7. The fluid shutoff valve assembly of claim 5 wherein reservoir region has a volume of between 150 mm$^3$ and 200,000 cm$^3$.

8. The fluid shutoff valve assembly of claim 1 wherein the pressure isolation valve is a piston-type valve that moves in a first direction that is generally perpendicular to the direction of fluid flow at a location where the pressure isolation valve intercepts the fluid flow path.

9. The fluid shutoff valve assembly of claim 8 wherein the fluid shutoff valve moves in a second direction substantially opposite to the first direction.

10. The fluid shutoff valve assembly of claim 1 wherein the pressure isolation valve is configured to close between 0.1 ms and 10 seconds before the fluid shutoff valve.

11. The fluid shutoff valve assembly of claim 5, wherein the reservoir region includes at least one mixing port.

12. The fluid shutoff valve assembly of claim 5, wherein the reservoir region includes at least one static or dynamic mixer.

13. The fluid shutoff valve assembly of claim 1 wherein the fluid shutoff valve is disposed adjacent a filling nozzle and is in fluid communication therewith.

14. The fluid shutoff valve assembly of claim 13 wherein the filling nozzle has more than one orifice through which the fluid passes.

15. The fluid shutoff valve assembly of claim 14 wherein the fluid shutoff valve is oriented such that the fluid shutoff valve moves in a direction that is generally perpendicular to the direction of fluid flow at a location where the fluid shutoff valve intercepts the fluid flow path through at least one of the orifices of the nozzle.

16. The fluid shutoff valve assembly of claim 1 wherein the fluid shutoff valve is configured to seal the outlet orifice when the fluid shutoff valve is closed.

17. The fluid shutoff assembly of claim 16 wherein the vacuum device is a piston-type valve.

18. A fluid shutoff valve assembly for a fluid filling line, the valve assembly having a fluid flow path defining a direction of fluid flow, the assembly comprising:
    a fluid inlet orifice in fluid communication with a source of a fluid that is under pressure, the fluid inlet orifice allowing the fluid to flow in the direction of fluid flow from the source of the fluid into the fluid flow path of the valve assembly;
    a fluid outlet orifice in fluid communication with the fluid flow path of the valve assembly and through which the fluid may flow out of the valve assembly;
    a first valve in fluid communication with the fluid inlet orifice and having a first valve open configuration which allows the fluid to flow through the first valve and a first valve closed configuration that prevents fluid from flowing past the first valve; and
    a second valve in fluid communication with the first valve and the fluid outlet orifice, the first valve and the second valve being separated from each other by a reservoir region having a length of at least 5 mm, the second valve having a second valve open configuration which allows the fluid to flow through the second valve and a second valve closed configuration that prevents fluid from flowing past the second valve, wherein the second valve is oriented such that the second valve moves in a direction that is generally perpendicular to the direction of fluid flow at a location where the second valve intercepts the fluid flow path, and wherein the valve assembly is configured such that the first valve closes before the second valve closes, thereby reducing the pressure of the fluid in the fluid flow path located between the first valve and the second valve prior to the second valve closing.

19. The fluid shutoff valve assembly of claim 18 wherein the second valve is a piston-type valve.

20. The fluid shutoff valve assembly of claim 18 wherein the second valve is a rotating valve and the rotating valve has an axis of rotation that is generally perpendicular to the fluid flow path.

21. The fluid shutoff valve assembly of claim 18, wherein the reservoir region includes at least one mixing port.

22. The fluid shutoff valve assembly of claim 18, wherein the reservoir region includes at least one static or dynamic mixer.

23. The fluid shutoff valve assembly of claim 18 wherein the second valve is disposed adjacent a filling nozzle and is in fluid communication therewith.

24. The fluid shutoff valve assembly of claim 23 wherein the filling nozzle has more than one orifice through which the fluid passes.

25. The fluid shutoff valve assembly of claim 24 wherein fluid shutoff valve is oriented such that the fluid shutoff valve moves in a direction that is generally perpendicular to the direction of fluid flow at a location where the second valve intercepts the fluid flow path through at least one of the orifices of the nozzle.

26. The fluid shutoff valve assembly of claim 18 wherein the second valve is configured to seal the outlet orifice when the second valve is closed.

27. The fluid shutoff assembly of claim 18 further including a vacuum device disposed between the first valve and the second valve, the vacuum device configured to provide negative pressure to the reservoir region for at least a period of time when the first valve is closed and the second valve is open.

28. The fluid shutoff assembly of claim 18 wherein the vacuum device is a piston-type valve.

29. The fluid shutoff assembly of claim 18 wherein the first valve includes a partially closed configuration that allows some, but not all of the fluid to pass.

30. The fluid shutoff valve assembly of claim 18 wherein the first valve moves in a first direction and the second valve moves in a second direction that is substantially opposite to the first direction.

31. A method of reducing the back-splash associated with filling a container with a fluid, the method including:
providing a container to be filled with a fluid, the container having an opening;
providing a nozzle adjacent the opening of the container;
providing a valve assembly in fluid communication with the nozzle;
providing the fluid to fill the container to the valve assembly, the valve assembly including a fluid inlet orifice in fluid communication with a source of the fluid, the fluid inlet orifice allowing the fluid to flow in the direction of fluid flow from the source of the fluid into the fluid flow path of the valve assembly; a fluid outlet orifice in fluid communication with the fluid flow path of the valve assembly and through which the fluid may flow out of the valve assembly; a first valve in fluid communication with the fluid inlet orifice and having a first valve open configuration which allows the fluid to flow through the first valve, a first valve closed configuration that prevents fluid from flowing past the first valve, and a first stopping structure; and a second valve in fluid communication with the first valve and the fluid outlet orifice, the second valve having a second valve open configuration which allows the fluid to flow through the second valve, a second valve closed configuration that prevents fluid from flowing past the second valve and a second stopping structure, wherein the first valve and the second valve are separated from each other by a reservoir region;
closing the first valve at a first predetermined time by moving the first valve from the first valve open configuration to the first valve closed configuration to temporarily cut off the source of the fluid; and
closing the second valve at a second predetermined time that is after the first predetermined time by moving the second stopping structure direction that is generally perpendicular to the direction of fluid flow at a location where the second valve intercepts the fluid flow path or rotating the stopping structure about an axis or rotation that is generally perpendicular to the direction of fluid flow at a location where the second valve intercepts the fluid flow path from the second valve open configuration to the second valve closed configuration in order to prevent the fluid in the fluid flow path from exiting the fluid outlet orifice.

32. The method of claim 31 further including a vacuum device disposed between the first valve and the second valve, the vacuum device configured to provide negative pressure to the reservoir region between the first predetermined time and the second predetermined time.

33. The method of claim 31 further including providing one or more ingredients to the reservoir region to be mixed with the fluid.

34. The method of claim 31 wherein the nozzle remains outside of the opening of the container while the container is being filled.

35. The method of claim 31 wherein moving the second stopping structure in a direction that is generally perpendicular to the direction of fluid flow at a location where the second valve intercepts the fluid flow path or rotating the stopping structure about an axis or rotation that is generally perpendicular to the direction of fluid flow at a location where the second valve intercepts the fluid flow path from the second valve open configuration to the second valve closed configuration shears the fluid in order to prevent the fluid in the fluid flow path from exiting the fluid outlet orifice.

36. The method of claim 31 wherein closing the first valve includes moving the valve to a partially closed configuration for a predetermined amount of time before the valve is fully closed.

* * * * *